United States Patent [19]
Amagasa et al.

[11] Patent Number: 6,087,795
[45] Date of Patent: Jul. 11, 2000

[54] WIPER CONTROL METHOD

[75] Inventors: Toshiyuki Amagasa, Ota; Takashi Hoshino, Isezaki, both of Japan

[73] Assignee: Mitsuba Corporation, Kiryu, Japan

[21] Appl. No.: 09/136,386

[22] Filed: Aug. 19, 1998

[30] Foreign Application Priority Data

Aug. 28, 1997 [JP] Japan .................................. 9-232988

[51] Int. Cl.$^7$ ................................................ G05B 5/00
[52] U.S. Cl. .......................... 318/446; 318/452; 318/483; 318/DIG. 2; 359/841; 307/10.1; 15/250.001
[58] Field of Search .................................. 359/841, 843, 359/871–874, 876, 877; 318/DIG. 2, 280–286, 445–447, 452–458, 466–468, 483; 307/10.1, 9.1; 15/250.001

[56] References Cited

U.S. PATENT DOCUMENTS

| | | | |
|---|---|---|---|
| 4,131,834 | 12/1978 | Blaszkowski | 318/483 |
| 4,317,073 | 2/1982 | Blaszkowski | 318/483 |
| 4,911,545 | 3/1990 | Miller | 359/841 |
| 5,059,877 | 10/1991 | Teder | 318/444 |
| 5,375,014 | 12/1994 | Fujie et al. | 359/841 |
| 5,477,390 | 12/1995 | Boddy et al. | 359/841 |
| 5,497,273 | 3/1996 | Kogita et al. | 359/843 |
| 5,557,476 | 9/1996 | Oishi | 359/841 |
| 5,773,946 | 6/1998 | Montero | 318/460 |
| 5,808,734 | 9/1998 | Kolari | 356/237.2 |
| 5,823,054 | 10/1998 | Brouwer | 359/872 X |
| 5,847,826 | 12/1998 | Fukui et al. | 318/DIG. 2 X |
| 5,861,758 | 1/1999 | Berberich | 318/DIG. 2 X |
| 5,867,328 | 2/1999 | Stapp et al. | 359/841 |

FOREIGN PATENT DOCUMENTS

| | | |
|---|---|---|
| 0 681 945 A2 | 11/1995 | European Pat. Off. . |
| 59-14563 | 1/1984 | Japan . |
| 59-149844 | 8/1984 | Japan . |
| 60-183247 | 9/1985 | Japan . |
| 60-183248 | 9/1985 | Japan . |
| 62-82865 | 5/1987 | Japan . |
| 62-163456 | 10/1987 | Japan . |
| 62-189275 | 12/1987 | Japan . |
| 63-28566 | 2/1988 | Japan . |
| 63-30260 | 2/1988 | Japan . |
| 64-41446 | 2/1989 | Japan . |
| 64-41447 | 2/1989 | Japan . |
| 1-285443 | 11/1989 | Japan . |
| 4-362448 | 12/1992 | Japan . |
| 5-105034 | 4/1993 | Japan . |
| 93/02898 | 2/1993 | WIPO . |

*Primary Examiner*—Brian Sircus
*Attorney, Agent, or Firm*—McCormick, Paulding & Huber LLP

[57] ABSTRACT

The wiper control method is capable of preventing damages on a wiper due to erroneous operation of the wiper when a vehicle is subjected to a car washer with its wiper operation kept in an "AUTO" mode, and the wiper automatically operates without troubles while driving. The wiper control method is used for an automatic wiper system which automatically controls wiper operation of a vehicle by sensing the climate condition by a rain drop sensor 7, and the state of a door mirror of the vehicle is detected by a mirror folding detection switch 5. When the door mirror is folded, wiper operation control performed by the automatic wiper system is stopped so that the wiper is not operated even if the rain drop sensor 7 detects a rain drop.

8 Claims, 3 Drawing Sheets

WIPER CONTROL METHOD

BACKGROUND OF THE INVENTION

1. Field of the Invention

The present invention relates to a wiper control method for vehicles, and particularly to a technique effective when applied to wiper control of vehicles equipped with an automatic wiper system.

2. Related Art Statement

In recent years, as a part of automation of on-vehicle equipment, developments have been made to a vehicle equipped with a so-called automatic wiper system which senses climate conditions and to automatically start a wiper or change the operation speed thereof. In the automatic wiper system, for example, in a car, a rain drop detector is provided at a windshield, a radiator grill, a front bumper, or the like, to sense raining conditions. In this case, particularly a detector for detecting rain drops sticking to the window shield is capable of attaining data directly relating to the view field from a driver and is therefore advantageous for control of the wiper, so that this kind of detector has come to be used in many vehicles.

Meanwhile, a wiper of a vehicle operates according to modes selected by a driver. In general, a vehicle equipped with an automatic wiper system adopts modes of "OFF", "INT (intermittent)", "LO", and "HI", and a mode of "AUTO" is added to these modes. When a driver selects the mode "AUTO", the wiper operation is controlled in accordance with a detected rain drop condition.

In this kind of automatic wiper system, however, if a drop of water sticks to a portion for sensing a rain drop when the operation mode is "AUTO", the wiper starts operating regardless of whether or not the drop of water is actually a rain drop. For example, when a vehicle is set in a car washer with the wiper'switch kept in the "AUTO" mode, the sensing portion of the system determines any drop of car-wash liquid as a "rain drop" and starts operation of the wiper. In this case, if the vehicle is washed by hands by a user or so, the wiper can be stopped by switching manually the operation mode to "OFF". However, if the vehicle is washed by a car washer, the system continues determining that the vehicle is in a rain condition and operating the wiper. Therefore, any brush of the car washer may be brought into contact with wiper arms and blades or the wiper arms may be entangled in the brush, thereby damaging the wiper.

Hence, in a vehicle mounting an automatic wiper system, various methods have conventionally been adopted to prevent troubles as described above when washing the vehicle. For example, Japanese Patent Application laid open No. 59-14563 discloses an apparatus in which wiper operation is stopped by changing a switch to a predetermined contact position when washing a vehicle. Further, in an apparatus according to Japanese Patent Application laid open No. 59-149844, the wiper is switched to intermittent operation when the rain stops and a driver is suggested shifting a switch. However, these methods carried out by a driver do not function at all if the driver forgets to operate the switch and can hardly be said to be basically effective countermeasures.

Hence, proposals have been made for a method of automatically stopping the wiper when washing a vehicle regardless of switching operation taken by a driver, and several of those proposals will be as follows. Japanese Patent Application laid open No. 60-183247 shows a method in which the wiper does not start operating until the switch is turned on again, once the rain stops. Japanese Patent Applications laid open No. 60-183248 and No. 62-189275 shows a method in which wiper operation is stopped when any rotating component of a car washer has a contact with an external switch, or when any human body or car washer comes close to or has a contact with a rainfall amount detection means.

In addition, Japanese Patent Application laid open No. 1-41446 shows a method in which the mode is switched to the "AUTO" mode only when an ignition switch is on and the driver puts on a safety seat belt. Japanese Patent Applications laid open No. 1-41447, No. 62-82865, and No. 63-28566 show a method in which opening/closing of a door is detected, and an alarm buzzer sounds or the "AUTO" mode is released if the driver goes apart from the vehicle with the mode kept in "AUTO".

Further, Japanese Patent Application laid open No. 1-285443 shows a method of inhibiting the "AUTO" mode operation when the speed of the vehicle is zero, and Japanese Patent Application laid open No. 62-163456 shows a method of preventing the wiper from operating when the parking brake is operated. In addition, as in Japanese Patent Application laid open No. 63-30260, a proposal has been made for a method of inhibiting the "AUTO" mode operation when the shift lever is at the parking position.

Although every of the methods described above includes a function of inhibiting automatic wiper operation when washing a vehicle, most of them achieve only such automatic wiper operation that is far from actual "AUTO" mode operation or are attained by sacrificing wiper operation while the vehicle is parking. These methods cannot always be practical in consideration of various situations while actual driving.

For example, in case of the method in which the switch must be reset within a predetermined period after the rain stops, the switch must be reset every time the rain starts again within the predetermined period, and this method is thus far from what the "AUTO" mode is. Meanwhile, in case of the method in which the wiper operation is stopped upon a contact with a human body or a car washer, the wiper is stopped if something has a contact even during a period when the vehicle is not subjected to car washing.

Further, in the method depending on the ignition switch and the seat belt, the wiper does not operate when the vehicle parks or stops. As for the method in which the buzzer alarms upon detection of opening/closing of a door, two different alarms may confuse each other since many types of vehicles have a function of alarming when a driver forgets to turn off headlights when a door is opened. Meanwhile, in the methods in which the wiper operation is stopped when the speed is zero or depending on the position of the parking brake or the shift lever, the wiper does not operate at the time of waiting for a signal or parking the car. In several of these methods, the wiper operation is guaranteed for a period of waiting for a signal by linking the wiper with a timer. Even in such cases, the wiper operation is stopped if the vehicle parks or stops over a predetermined time period.

SUMMARY OF THE INVENTION

The present invention has an object of providing a wiper control method capable of preventing damages on a wiper due to erroneous operation of the wiper in case where a car is washed with the wiper operation kept in an "AUTO" mode and capable of automatically operating the wiper without problems while driving.

According to the invention, there is provided a wiper control method for use in an automatic wiper system which detects a climate condition by a rain drop detector to control automatically wiper operation of a vehicle, wherein a state of a door mirror equipped on the vehicle is detected and wiper operation control performed by the automatic wiper system is stopped when the door mirror is folded.

Further, a wiper can be inhibited from being operated even if the rain drop detector detects a rain drop, when the door mirror is folded.

In this invention, the state of the door mirror can be detected by a limit switch equipped on the door mirror, which outputs a signal when the door mirror is folded.

Preferably, the door mirror can be detected by operation of a limit switch which is equipped on a motor for folding the door mirror and stops operation of the motor when the door mirror reaches a predetermined folding position or standing position.

Further, the state of the door mirror can be detected by a proximity switch for detecting a position of a limit switch which is equipped on a motor for folding the door mirror and stops operation of the motor when the door mirror reaches a predetermined folding position or standing position.

Also, the state of the door mirror can be detected by a state of a switch provided in the vehicle for switching folding and standing states of the door mirror.

On the other hand, according to the invention, there is provided a wiper control method for use in an automatic wiper system which detects a climate condition by a rain drop detector to control automatically wiper operation of a vehicle, wherein in case where an ignition switch of the vehicle is ON and a mode of automatically controlling wiper operation is selected, a wiper is automatically controlled based on detection data from the rain drop detector if a door mirror of the vehicle is detected to be standing, and in case where the wiper is detected to be folded, the wiper is inhibited from being operated even if a rain drop is detected by the rain drop detector.

Further, in case where the door mirror is detected to be standing, the mode of the wiper is reconfirmed, and the wiper is automatically controlled based on the detection data from the rain drop detector if it is reconfirmed that the mode of automatically controlling the wiper is selected.

The advantages of the present invention may be summarized as follows.

When the door mirror is folded, the wiper operation control made by the automatic wiper system is stopped and the wiper is prevented from being operated even if the rain drop sensor detects a rain drop. As a result, an advantage is obtained in that the wiper is prevented from being operated by mistaking cleaning water of a car washer as a rain drop even when a car is washed by a car washer with the wiper kept in the "AUTO" mode. It is therefore possible to prevent a situation that the wiper arms or blades are entangled in a car washer brush and the wiper arms and the like are damaged. In addition, since the wiper operation depends on the state of a door mirror, the wiper operation does not stops when the driver intends to drive and any repeated switch operation is not required for operating the wiper.

The above-described and other objects, and novel feature of the present invention will become apparent more fully from the description of the following specification in conjunction with the accompanying drawings.

DESCRIPTION OF THE PREFERRED EMBODIMENT

Figure 1:
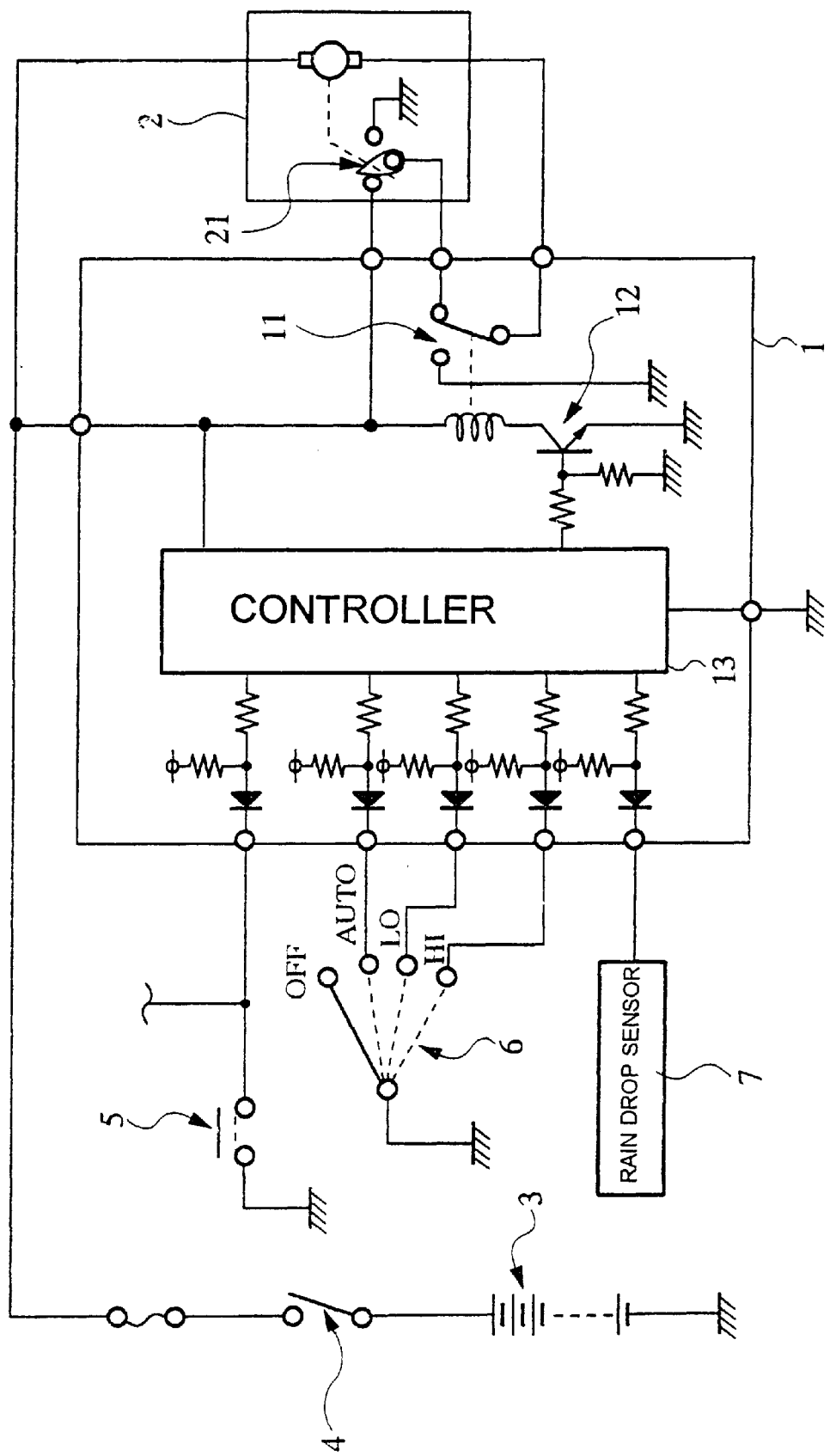
FIG. 1 is a block diagram showing the structure of an automatic wiper system according to the structure of an embodiment of the present invention.

In the following, embodiments of the present invention will be explained in details. FIG. 1 is a block diagram showing the structure of an automatic wiper system according to an embodiment of the present invention. In the present embodiment, explanation will be made with reference to an example of a wiper apparatus for wiping rain drops sticking to a windshield of a car.

When a car is washed by a car washer (machine), the car enters into the car washer with its door mirrors closed (or folded), so as not to disturb operation of brushes and in order to utilize effectively a space. That is, the door mirrors are always closed when using a car washer. Meanwhile, while driving a car, the door mirrors are always kept standing to watch the surroundings and there will scarcely be a situation that the door mirrors are closed every time the car waits for a signal. Also, when the car parks, the driver normally keeps the door mirrors standing until he or she comes apart from the car to obtain the rear view field. The driver closes or folds the door mirrors only when he comes apart from the car parking. This means that the action of folding the door mirrors is an indication of the intention that the driver will not drive the car, and therefore, there will be no practical problems if the wiper does not work while the door mirrors are closed or folded. Hence, in the wiper control method according to the present invention, whether or not the door mirrors are closed is detected, and operation control of the wiper is performed by reading the driver's intention from the detection result.

It may be consider that the wiper operation can be stopped by detecting folding of an automatic antenna since the automatic antenna is folded in a car washer. However, listening to a radio is not related to driving, and the automatic antenna is folded when the driver does not listen to the radio. Therefore, if a detection signal indicating folding of the automatic antenna is utilized, the wiper undesirably does not operate when the driver drives without listening to the radio.

In the present automatic wiper system, a wiper motor 2 is driven and controlled by a control device 1, as shown in FIG. 1. The wiper motor (which will be referred to as only a motor) 2 and the control device 1 are supplied with a power through an ignition switch 4 from a battery 3. The control device 1 is provided with a relay 11 for controlling operation of the motor 2, and a transistor 12 for turning ON/OFF the relay 11. Further, ON/OFF of the transistor 12 is controlled by a controller 13 provided in the control device 1.

Figure 2:
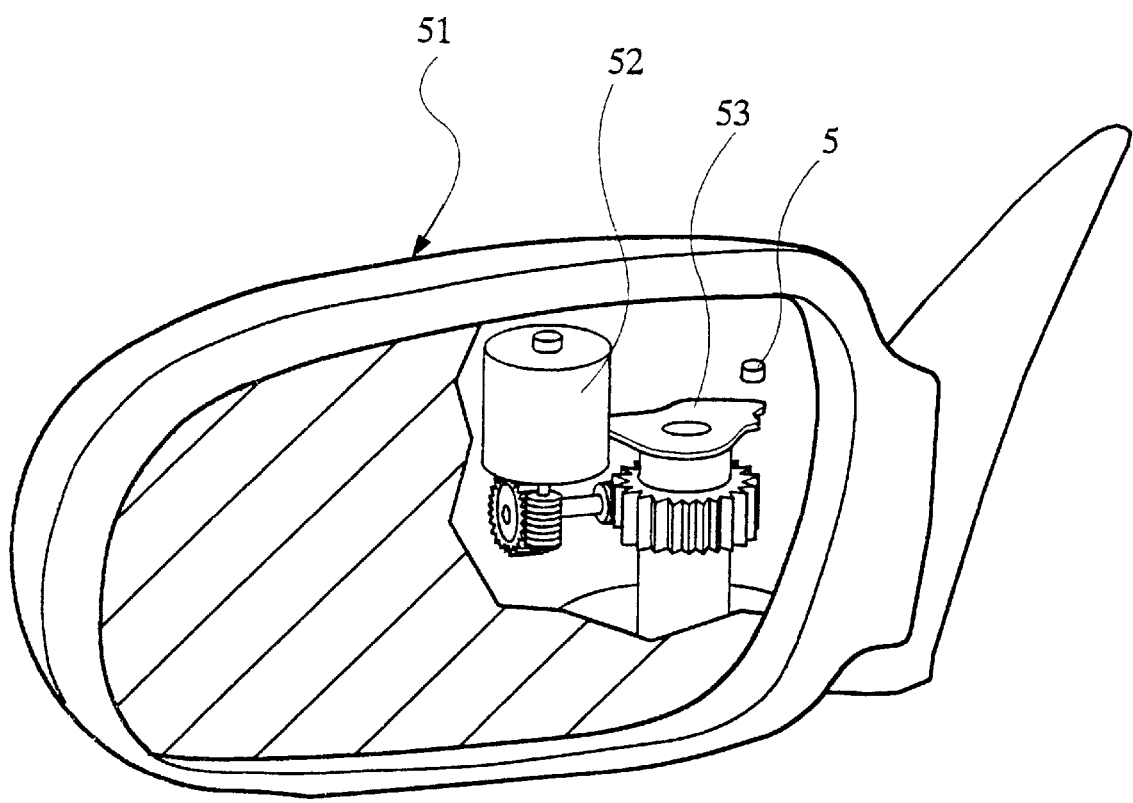
FIG. 2 is a view illustrating the internal structure an electric door mirror.

The control device 1 is connected with a mirror folding detection switch (hereinafter abbreviated as a mirror switch) for detecting the state of a door mirror. The mirror switch 5 is equipped inside an electric door mirror 51 as shown in FIG. 2 and serves to detect whether the electric door mirror 51 stands or is folded. In this case, the mirror switch 5 is equipped as a proximity switch which detects the position of a limit switch 53 of a mirror folding motor 52. Note that the limit switch 53 itself can be used also as the mirror switch 5 or the state of the door mirror can be detected by detecting the state of the mirror folding switch.

The control device 1 is further connected with an operation switch 6 and operation of the wiper can be switched between modes of "OFF", "AUTO", "LO", and "HI". The control device 1 is connected with a rain drop sensor (or rain drop detector) 7 by which the current climate condition can be detected continuously. When the mirror stands and the operation switch 6 is in the "AUTO" mode, the motor 2 is driven and controlled on the basis of a detection signal from the rain drop sensor 7. When the operation switch 6 is in the "LO" or "HI" mode, the motor 2 is driven under a predetermined condition regardless of the state of the mirror.

Figure 3:
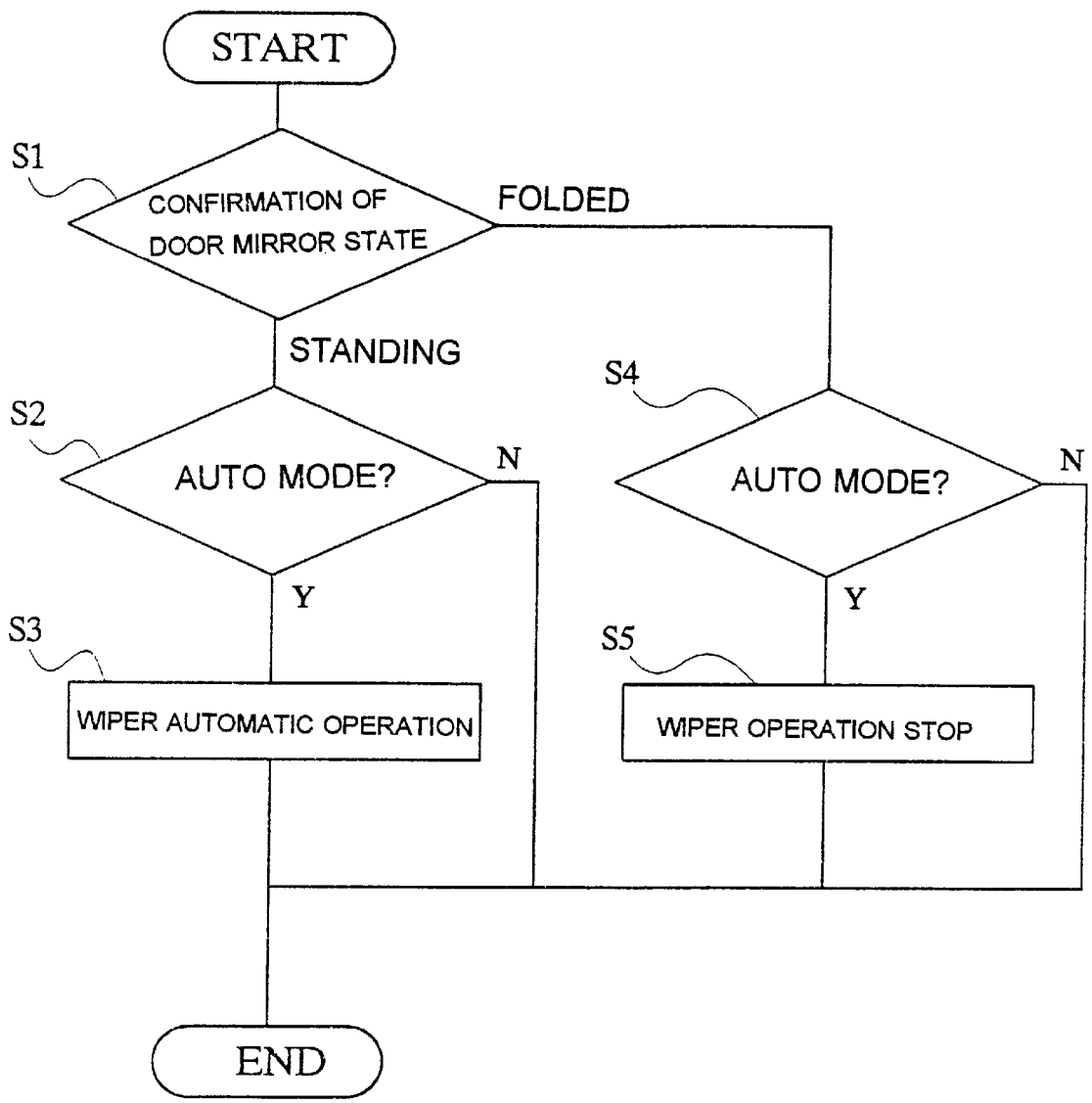
FIG. 3 is a flowchart showing wiper control procedures in the "AUTO" mode.

Next, explanation will be made of a wiper control method in the automatic wiper system and particularly of a relationship between the state of the door mirror and the wiper operation in the "AUTO" mode. FIG. 3 is a flowchart showing wiper control procedures in the "AUTO" mode.

Firstly, if the "AUTO" mode is selected when the ignition switch 4 is ON, the controller 13 confirms the state of the door mirror (S1). If the door mirror stands, the state of the operation switch 6 is confirmed again (S2). If it is then confirmed that the switch 6 is in the "AUTO" mode, the wiper is automatically controlled. That is, whether or not the wiper should be operated is determined on the basis of the detection data obtained by the rain drop sensor 7, and the wiper operation is appropriately controlled in accordance with the rain drop amount (S3). When the operation switch is not in the "AUTO" mode, the processing is terminated.

When driving the wiper, the controller 13 turns on the transistor 12 and operates the relay 11 to be conducted with a contact point in the left side of the figure. In this manner, the motor 2 is supplied with an electric power from the battery 3 and is started thereby. In contrast, when the wiper is not driven, the transistor 12 is brought into an OFF state and the relay 11 is brought into the state as shown in FIG. 3. In this time, the circuit which drives the motor 2 is not made and the motor 2 is therefore stopped.

When the door mirror is folded, the state of the operation switch 6 is confirmed again (S4). If the operation mode is confirmed to be the "AUTO" mode, operation of the wiper is stopped even if a rain drop is detected (S5). In this case, the controller 13 recognizes the state of the door mirror from a change of an input signal from H to L by the conduct of the mirror switch 5. Based thereon, the transistor 12 is always kept OFF regardless of the detection data from the rain drop sensor 7. As a result of this, the motor 2 is not driven even when a rain drop is detected by the rain drop sensor in the "AUTO" mode. Therefore, the wiper does not operate even if a car is set in a car washer, maintaining the "AUTO" mode.

Thus, according to the present automatic wiper system, the wiper is prevented from being operated by mistaking cleaner water of a car washer as a rain drop, even if a car washer is used with maintaining the "AUTO" mode. Accordingly, it is possible to avoid a situation that the wiper arms or blades is entangled with a car washer brush and is damaged thereby. In addition, the "AUTO" operation of the wiper is canceled on the basis of the state of the door mirror. Therefore, the wiper operation is not stopped when the driver intends to drive the car, or the switch needs not be operated again to operate the wiper in spite of being in the "AUTO" mode.

Further, since the state of the door mirror is associated with the wiper operation, a secondary advantage is obtained in that the driver can be notified of the closed door mirror when the driver forgets to stand the door mirror and starts driving. Namely, since the wiper does not operate in spite of selecting "AUTO" mode when it is raining, the driver doubts the wiper operation and he or she finds that there are unusual something.

Detailed description has hereinabove been give of the invention achieved by the present inventor with reference to the embodiments. However, the present invention should not be limited to the embodiments described above and may be variously modified within the scope not departing from the gist.

For example, the mirror switch 5 is not limited to the form described above but may be driven mechanically or electrically as far as whether or not the door mirror is folded can be detected. The form of the mirror switch is not thus limited. Although the above embodiment has been explained with reference to an example of an electric door mirror, the present system can naturally be applied to a manual door mirror. In this case, the mirror switch 5 will be a limit switch or a proximity switch which physically detects the position of a hinge portion or the like of the door mirror.

In the present system, the wiper operation is stopped when at least one of the door mirrors equipped on both sides of a car is folded. However, the system may be arranged such that the wiper operation control is stopped only when both door mirrors are folded.

Finally, while the present invention is described particularly in terms of an automatic wiper system for a windshield of a car, it may be applied to a wiper for a rear window, a side window, a headlight, a door mirror, or the like.

What is claimed is:

1. A wiper control method for use in an automatic wiper system which detects a climate condition by a rain drop detector to control automatically wiper operation of a vehicle, wherein a state of a door mirror equipped on the vehicle is detected and wiper operation control performed by the automatic wiper system is stopped when the door mirror is folded.

2. A method according to claim 1, wherein a wiper is inhibited from being operated even if the rain drop detector detects a rain drop, when the door mirror is folded.

3. A method according to claim 1, wherein the state of the door mirror is detected by a limit switch equipped on the door mirror, which outputs a signal when the door mirror is folded.

4. A method according to claim 1, wherein the state of the door mirror is detected by operation of a limit switch which is equipped on a motor for folding the door mirror and stops operation of the motor when the door mirror reaches a predetermined folding position or standing position.

5. A method according to claim 1, wherein the state of the door mirror is detected by a proximity switch for detecting a position of a limit switch which is equipped on a motor for folding the door mirror and stops operation of the motor when the door mirror reaches a predetermined folding position or standing position.

6. A method according to claim 1, wherein the state of the door mirror is detected by a state of a switch provided in the vehicle for switching folding and standing states of the door mirror.

7. A wiper control method for use in an automatic wiper system which detects a climate condition by a rain drop detector to control automatically wiper operation of a vehicle, wherein in case where an ignition switch of the vehicle is ON and a mode of automatically controlling wiper operation is selected, a wiper is automatically controlled based on detection data from the rain drop detector if a door mirror of the vehicle is detected to be standing, and in case where the door mirror is detected to be folded, the wiper is inhibited from being operated even if a rain drop is detected by the rain drop detector.

8. A method according to claim 7, wherein in case where the door mirror is detected to be standing, the mode of the wiper is reconfirmed, and the wiper is automatically controlled based on the detection data from the rain drop detector if it is reconfirmed that the mode of automatically controlling the wiper is selected.

* * * * *